United States Patent
Jang

(10) Patent No.: US 7,679,683 B2
(45) Date of Patent: *Mar. 16, 2010

(54) IMAGE DISPLAY APPARATUS AND OPERATING METHOD THEREOF

(75) Inventor: Min Seok Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 51 days.

This patent is subject to a terminal disclaimer.

(21) Appl. No.: 11/675,065

(22) Filed: Feb. 14, 2007

(65) Prior Publication Data

US 2007/0132886 A1 Jun. 14, 2007

Related U.S. Application Data

(63) Continuation of application No. 10/313,870, filed on Dec. 4, 2002, now Pat. No. 7,193,658.

(30) Foreign Application Priority Data

Dec. 6, 2001 (KR) ................................ 2001/76942
Dec. 28, 2001 (KR) ........................... 2001-0087074

(51) Int. Cl.
*H04N 5/46* (2006.01)

(52) U.S. Cl. ...................... 348/555; 348/556; 348/569

(58) Field of Classification Search ................. 348/555, 348/556, 558, 554, 564, 569, 565, 581, 563; 345/699

See application file for complete search history.

(56) References Cited

U.S. PATENT DOCUMENTS

| 5,467,142 A * | 11/1995 | Ichinokawa ................. 348/556 |
| 6,256,045 B1 * | 7/2001 | Bae et al. ..................... 348/445 |
| 7,193,658 B2 * | 3/2007 | Jang ........................... 348/555 |

* cited by examiner

*Primary Examiner*—M. Lee
(74) *Attorney, Agent, or Firm*—Lee, Hong, Degerman, Kang & Waimey

(57) ABSTRACT

Disclosed is a method of managing an image display apparatus of the present invention. The method includes the steps of: (a) obtaining a first information on a predetermined output image format; (b) obtaining a second information on an input image format and a data broadcasting contents format; (c) comparing the first information on the predetermined output image format with the second information on the input image format and the data broadcasting contents format; (d) controlling output modes of the input image format and the data broadcasting contents format according to the predetermined output image format based on a comparison result of the output image format, the input image and the data broadcasting contents format performed by the comparing unit; and (e) outputting on image display unit the input image and the data broadcasting contents output modes of which are processed.

15 Claims, 11 Drawing Sheets input image
720x480(SD)

output image
960x540(1920x1080I,HD)

IMAGE DISPLAY APPARATUS AND OPERATING METHOD THEREOF

This application is a continuation of U.S. application Ser. No. 10/313,870, filed on Dec. 4, 2002, now U.S. Pat. No. 7,193,658 which claims the benefit of earlier filing date and right of priority to Korean Application No. 76942/2001, filed on Dec. 6, 2001, the contents of which are hereby incorporated by reference herein in its entirety.

BACKGROUND OF THE INVENTION

1. Field of the Invention

The present invention relates to a digital broadcasting system, and more particularly, to an image display apparatus and operating method for images and data broadcasting contents in a digital broadcast receiving system.

2. Description of the Related Art

Generally, image formats used in digital broadcast are classified into standard definition (SD) having an aspect of 4:3 such as 720×480 p, and high definition (HD) having an aspect of 16:9 such as 1920×1080 i and 1280×720 p. Data broadcasting contents transmitted with images is stored suitable for the resolution of its image format. In this case, the data broadcasting contents of the resolution of 960×540 that has aspect of 16:9 are appended to image of the resolution of 1920×1080 i that is HD image format. The data broadcasting contents of the resolution of 720×480 (or 640×480) are appended to image of the resolution of 720×480 i that is SD image format.

The resolution and aspect of the data broadcasting contents are determined and made according to image format. And then they are transmitted with image and inputted as an input signal to the receiving system (image display apparatus). If all the broadcast contents are transmitted in HD and receiving system have uniformly fixed resolution and aspect no complex problems occur in displaying data broadcasting contents. However, there are actually HD and SD. Receiving systems (image display apparatuses) is required to support various output image formats in the range from an analog television format to an HD monitor. Even though the receiving systems (image display apparatuses) are HDTVs, they have two image display modes such as wide mode and standard mode that can be chosen by users. When the resolution of input image and data broadcasting contents is different from that of output image of image display apparatus, there are some problems to display the data broadcasting contents For example, if the output image of an image display apparatus is set to be SD (720×480) and an input image is HD (1920×1080i) and the display area of data broadcasting contents 960×540, data broadcasting contents area is not confined in the effective display area of image display apparatus as shown in FIG. 1. On the contrary, if the output image of the image display apparatus is set to be HD (1920×1080i) having aspect of 16:9 and an input image and contents area are SD (720×480), the input image does not fully occupy the screen of the image display apparatus and some area is remained. Besides many problems can be caused by the fact that the size and file resolution of the data broadcasting contents area are different from those of the output image area. It is because new broadcast means such as data broadcast that has not been use image display apparatus.

SUMMARY OF THE INVENTION

Accordingly, the present invention is directed to an image display for images and data broadcasting contents that substantially obviates one or more problems due to limitations and disadvantages of the related art.

An object of the present invention is to provide an image display apparatus and operating method for images and data broadcasting contents capable of displaying the data broadcasting contents without distortion by reducing or expanding the display size of the data broadcasting contents according to the resolution of the input image and the resolution of the output image if the resolution of the input image is different from that of the output image.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention: as embodied and broadly described herein, an image display apparatus a comparing unit for obtaining a first information on a set output image format, obtaining a second information on a received input image format and a data broadcasting contents format and comparing the first information with the second information on the formats; a controlling unit for controlling output modes for the input image format and the data broadcasting contents format according to the set output image format based on a comparison result of the output image format, the input image and the data broadcasting contents format performed by the comparing unit; an OSD processing unit for processing an output of the received data broadcasting contents under a control of the controlling unit; an image display processing unit for processing an output of the received input image under a control of the controlling unit; and an image display unit for outputting the data broadcasting contents processed by the OSD processing unit and the input image processed by the image display processing unit.

The controlling unit controls the output modes of the input image format and the data broadcasting contents format using hardware means when controlling the output format according to the set output image format. The controlling unit controls the output modes of the input image format and the data broadcasting contents format using software means when controlling the output format according to the set output image format.

In another aspect of the present invention, a method of managing an image display apparatus comprises the steps of: A method of managing an image display apparatus of the present invention comprises the steps of: (a) obtaining a first information on a set output image format; (b) obtaining a second information on an input image format and a data broadcasting contents format; (c) comparing the first information on the set output image format with the second information on the input image format and the data broadcasting contents format; (d) controlling output modes of the input image format and the data broadcasting contents format according to the set output image format based on a comparison result of the output image format, the input image and the data broadcasting contents format performed by the comparing unit; and (e) outputting on image display unit the input image and the data broadcasting contents output modes of which are processed.

The set output image format in the step (a) can be set by a user to select an output image format selection switch provided in the image display apparatus. The input image and/or the data broadcasting contents are outputted to be scrolled on the image display unit.

According to the present invention, the image display apparatus and operating method of the present invention has the advantages to display the data broadcasting contents without distortion by reducing or expanding the display size of the data broadcasting contents according to the resolution of the input image and the resolution of the output image if the resolution of the input image is different from that of the output image.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
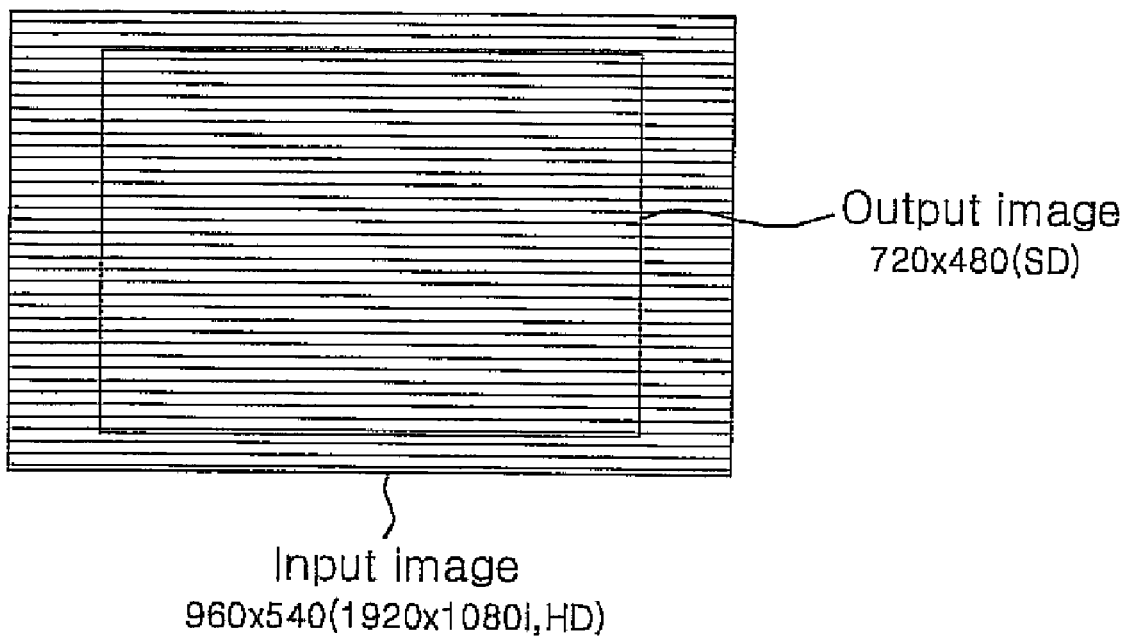
FIGS. 1 and 2 illustrates screen display when the resolution of an input image and data broadcasting contents is different from that of an output image in a conventional image display apparatus.
Figure 2:
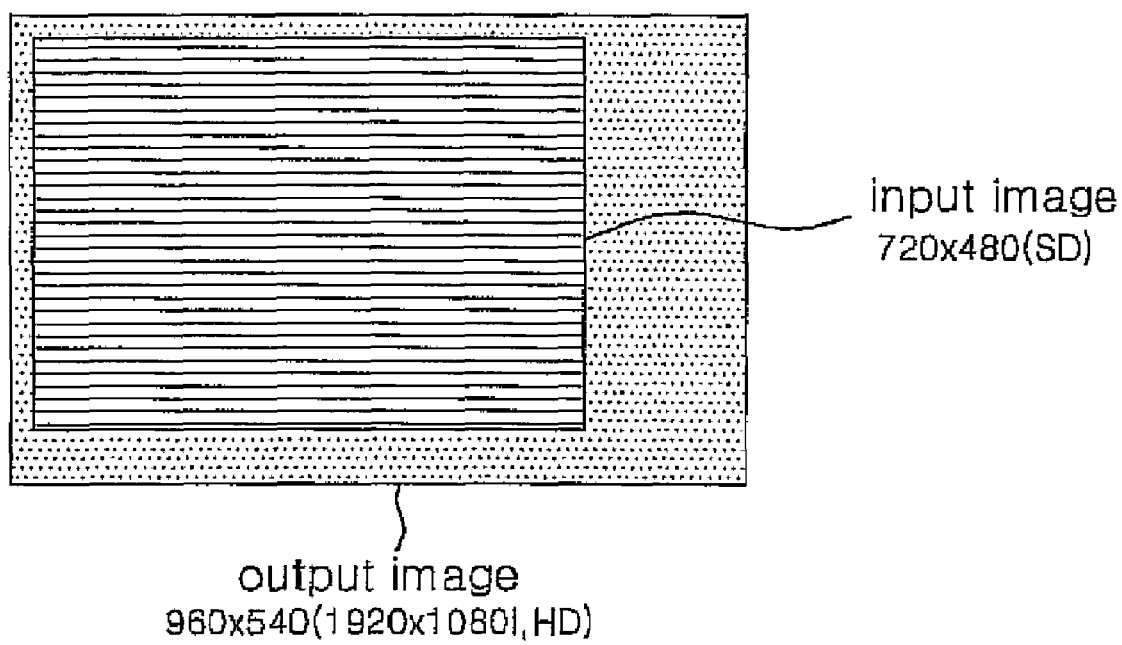
Figure 3:
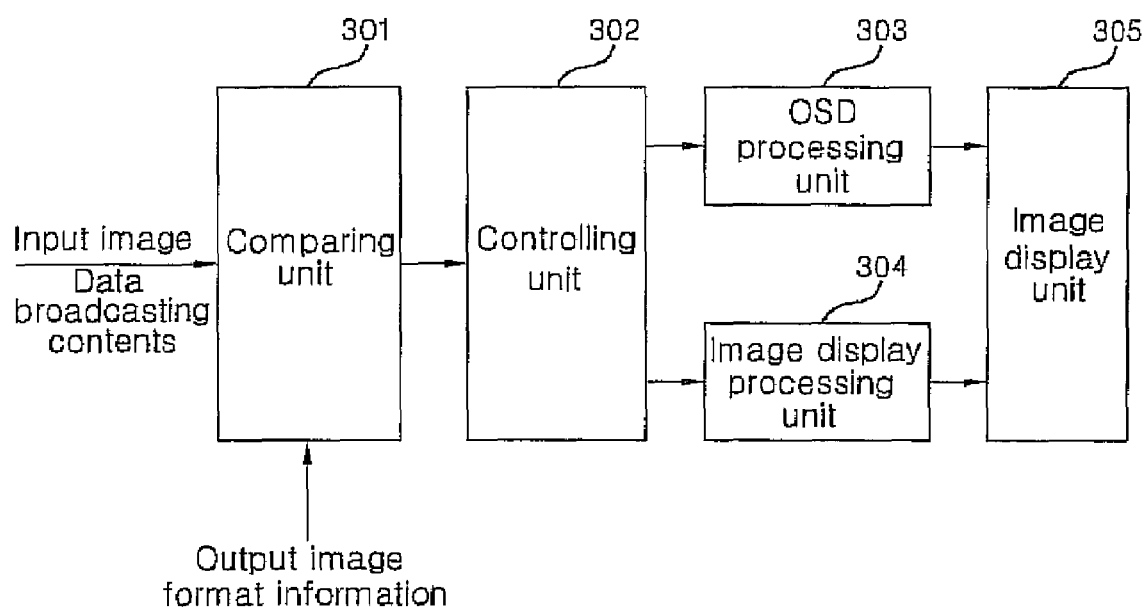
FIG. 3 illustrates schematic configuration of the image display apparatus according to the present invention.

FIG. 3 illustrates schematic configuration of the image display apparatus according to the present invention. Referring to FIG. 3, an image display apparatus includes: a comparing unit 301 for obtaining a first information on a set output image format, obtaining a second information on a received input image format and a data broadcasting contents format and comparing the first information with the second information on the formats; a controlling unit 302 for controlling output modes for the input image format and the data broadcasting contents format according to the set output image format based on a comparison result of the output image format, the input image and the data broadcasting contents format performed by the comparing unit 301; an OSD processing unit 303 for processing an output of the received data broadcasting contents under a control of the controlling unit 302; an image display processing unit 304 for processing an output of the received input image under a control of the controlling unit 302 and an image display unit 305 for outputting the data broadcasting contents processed by the OSD processing unit 303 and the input image processed by the image display processing unit 304.

Figure 4:
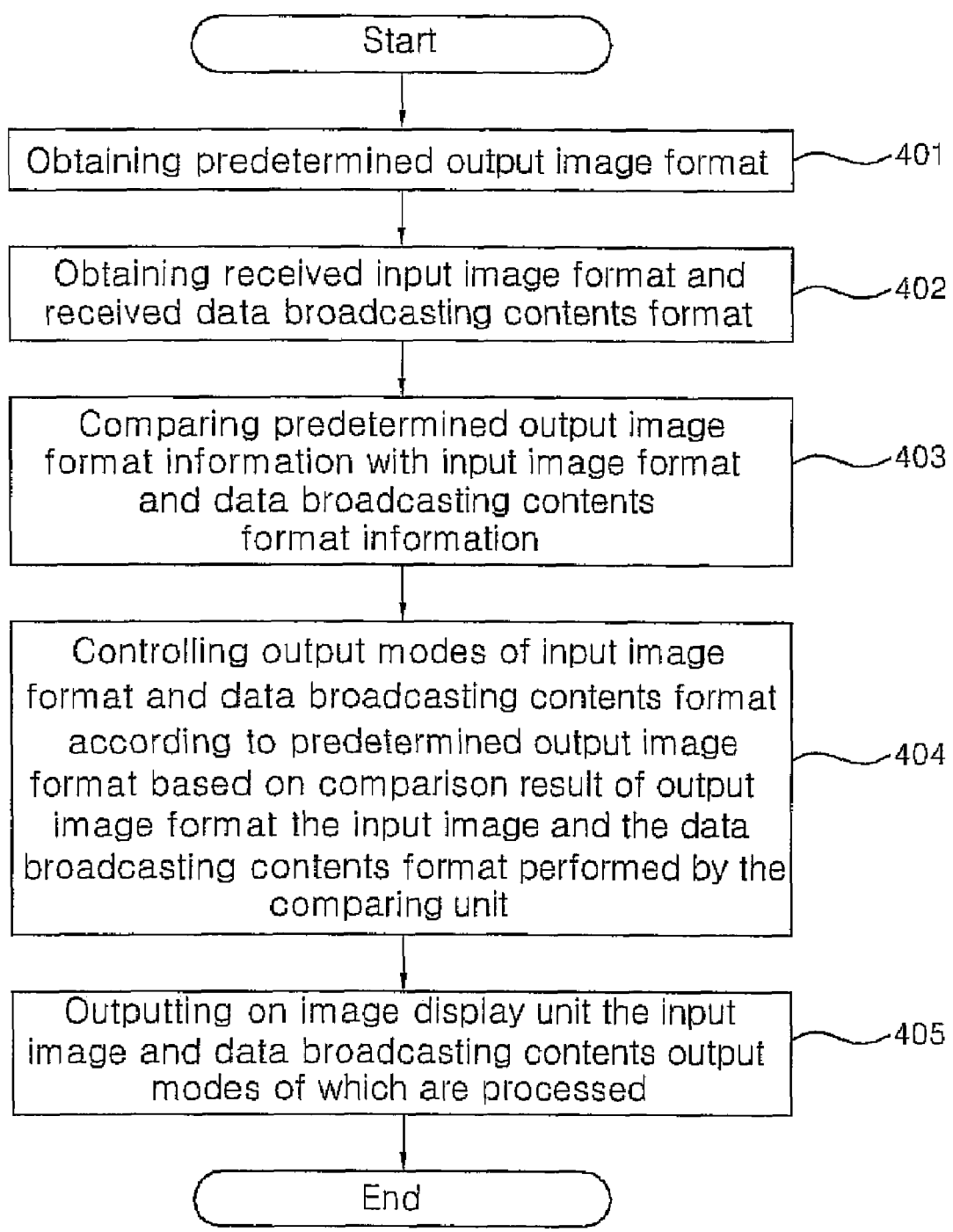
FIG. 4 is a flowchart showing a process controlling a display mode for data broadcasting contents according to the method of managing a image display apparatus according to the present invention.

Then, in the image display apparatus having the configuration as described above, the process controlling a display mode for data broadcasting contents will be described referring to FIG. 4. FIG. 4 is a flowchart showing a process controlling a display mode for data broadcasting contents according to the method of managing a image display apparatus according to the present invention.

First a comparing unit 301 of the image display apparatus obtains information on a predetermined output image format (step 401). Here, the output image format can be set by a user selecting an output image format selection switch provided in the image display apparatus. The settable output image format can be selected to be any mode of 720×480i (SD), 720×480 p (SD), 1920×1080 i (HD, 960×540 for data broadcasting contents) and 1280×720 p (HD). Based on the output image format obtained by the comparing unit 301, the controlling unit 302 sets a display area of the image and the data broadcasting contents according to the selected output image format by controlling the OSD processing unit 303 and the image display processing unit 304.

The comparing unit 301 of the image display apparatus obtains information on an input image format and a data broadcasting contents format (step 402) and compares the information on the predetermined output image format with the information on the input image format and the data broadcasting contents format (step 403). The controlling unit (302) of the image display apparatus controls output modes for the input image format and the data broadcasting contents format according to the predetermined output image format based on a comparison result of the output image format the input image and the data broadcasting contents format in step 403 (step 404). As a result of the comparison in step 403, if the output image format is the same as the input image format and the data broadcasting contents output format, the input image and the data broadcasting contents are outputted on an image display unit 305 without controlling the output format. If the output image format is set to an SD mode, the central viewing mode (aspect ratio 4:3) is used. If the output image format is set to an HD mode, the wide viewing mode (aspect ratio 16:9) is used.

On the other hand, as a result of comparison in step 403, if the output image format is not the same as the input image format and the data broadcasting contents output format the input image and the data broadcasting contents the output image formats of witch are controlled are outputted on a image display unit 305 with controlling the output format (step 405). Here, if the input image format and the data broadcasting contents format are received in an HD mode (16:9) and the output image format is set to an SD mode (4:3), the data broadcasting contents are scaled-down and displayed since data broadcasting contents size is greater than an output image area. Functions of scrolling and scaling in horizontal and vertical directions can be applied for each image display mode according to the set aspect ratio. Additionally, if the input image format and the data broadcasting contents format are received in SD mode (4:3) and the output image format is set to HD mode (16:9), the data broadcasting contents are scaled-up and displayed since data broadcasting contents size is smaller than an output image area. Functions of scaling in horizontal and vertical directions can be applied for each image display mode according to the set aspect ratio.

Referring to FIGS. 5 through 11, preferred embodiments showing a process controlling a display mode for data broadcasting contents according to the method of managing an image display apparatus according to the present invention will be described.

Figure 5:
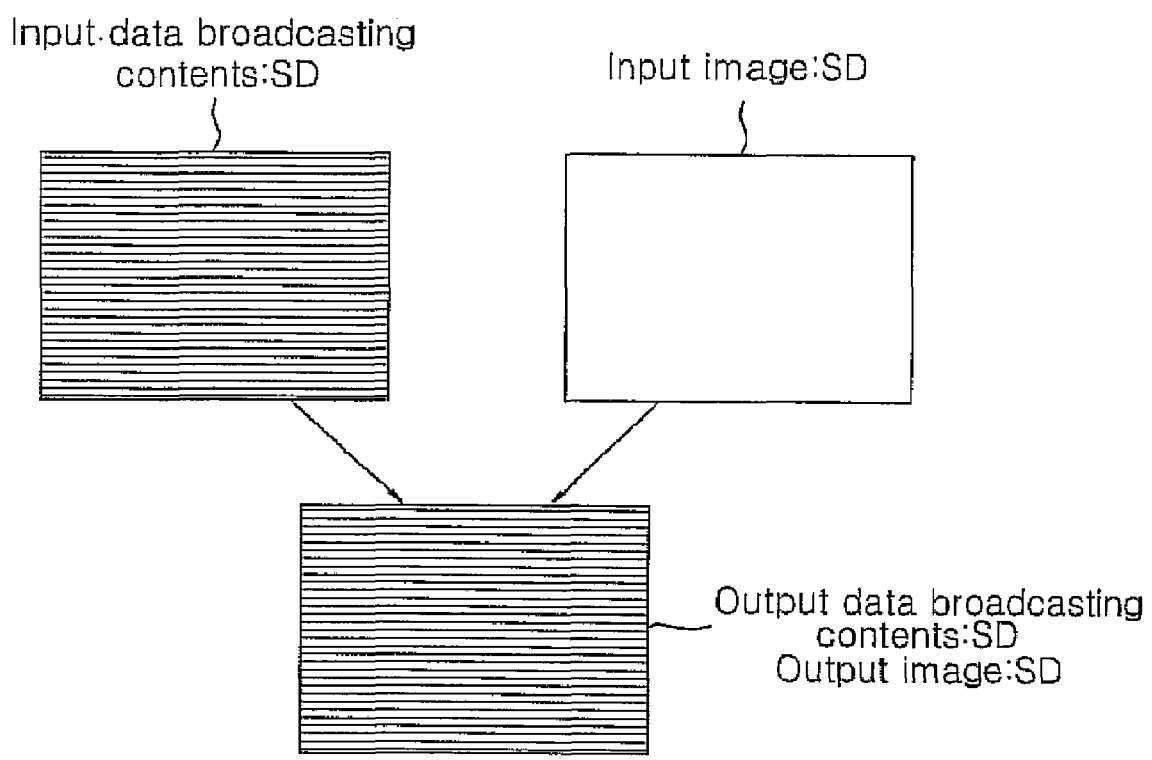
FIGS. 5 through 11 illustrate examples showing a process controlling a display mode for data broadcasting contents according to the method of managing a image display apparatus according to the present invention.

First, FIG. 5 shows that an input image format and a data broadcasting contents format are received in SD mode (for example, 720×480) and output image format is also SD mode. In this case, the received input image and the received data broadcasting contents can be outputted on the image display unit 305 in central viewing mode without scaling process. For example, if another mode is selected by a remote controller, they can be outputted in other mode (for example, standard mode or caption mode) other than central viewing mode.

Figure 6:
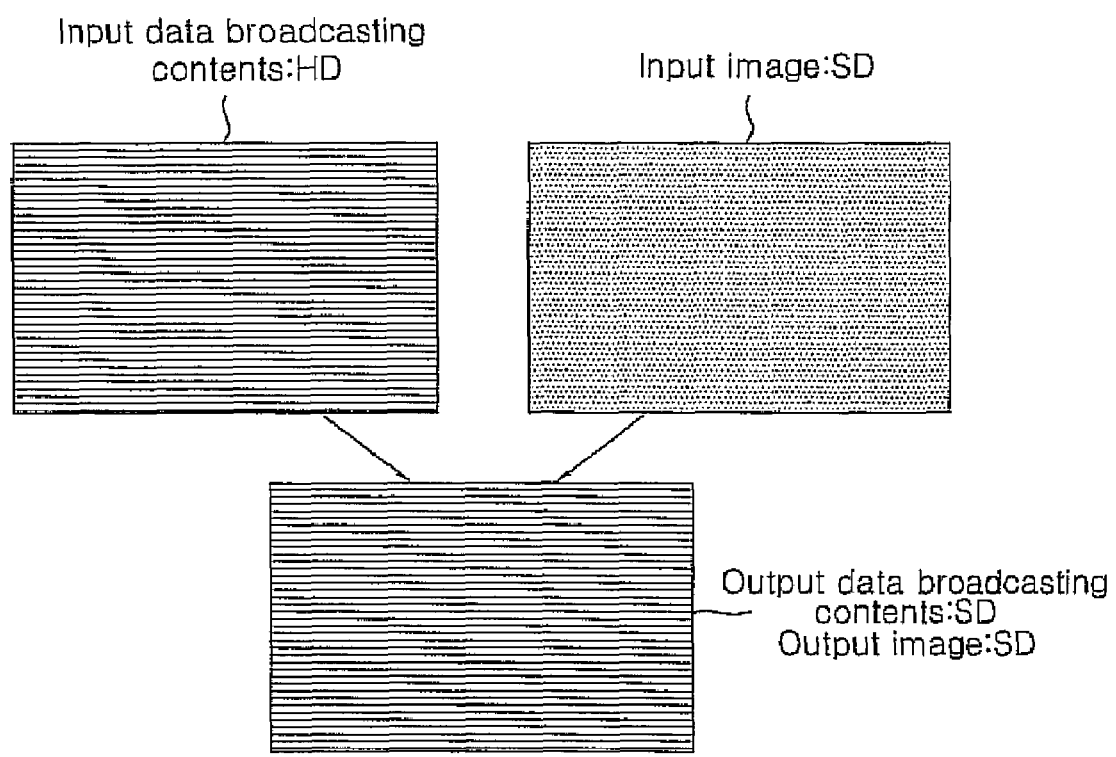

Then, FIG. 6 shows that an input image format and a data broadcasting contents format are received in HD mode (for example, 1920×1080 i, 960×540) and output image format is also HD mode. In his case, the received input image and the received data broadcasting contents can be outputted on the image display unit 305 in wide mode without scaling process.

Figure 7:
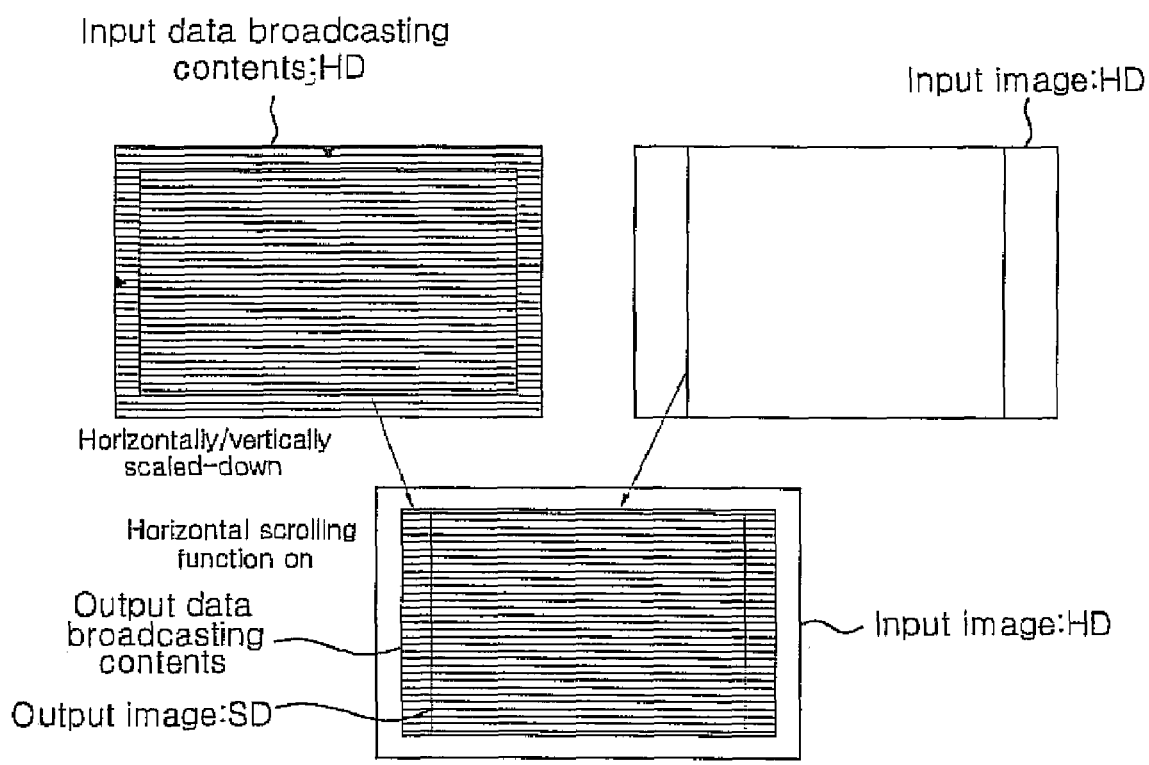
Figure 8:
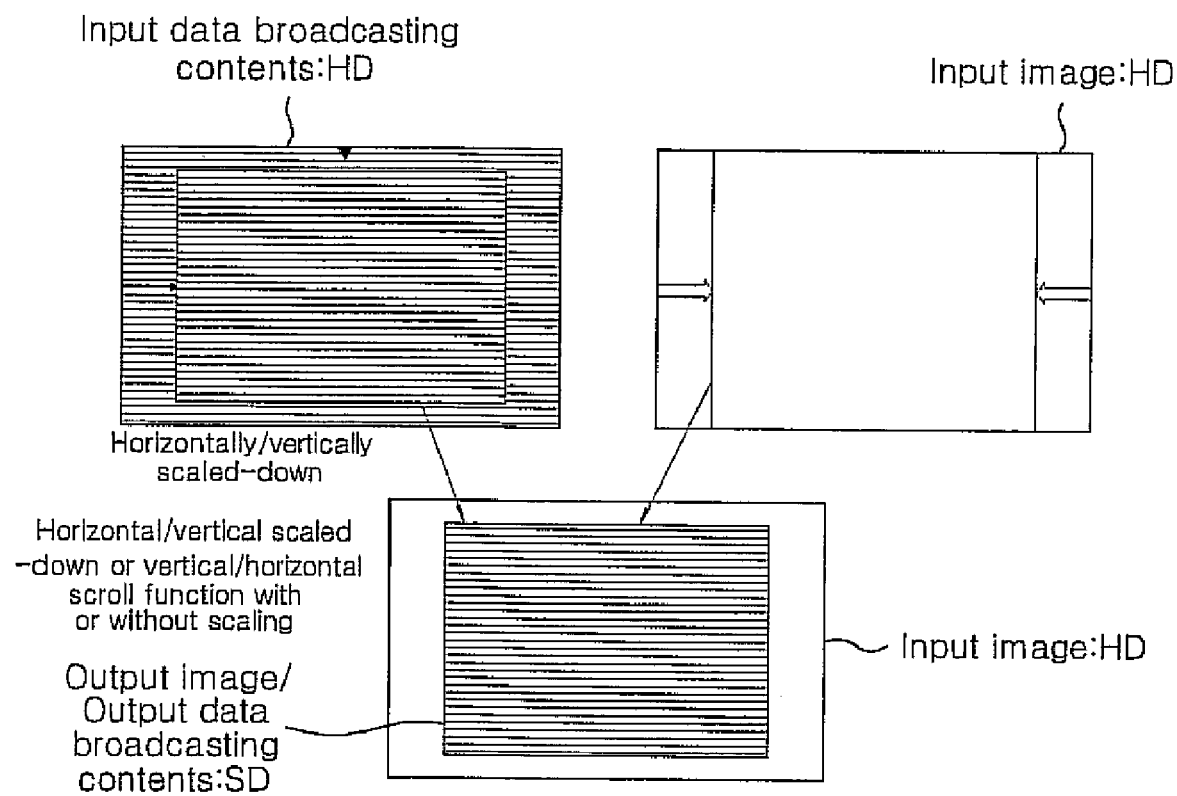
Figure 9:
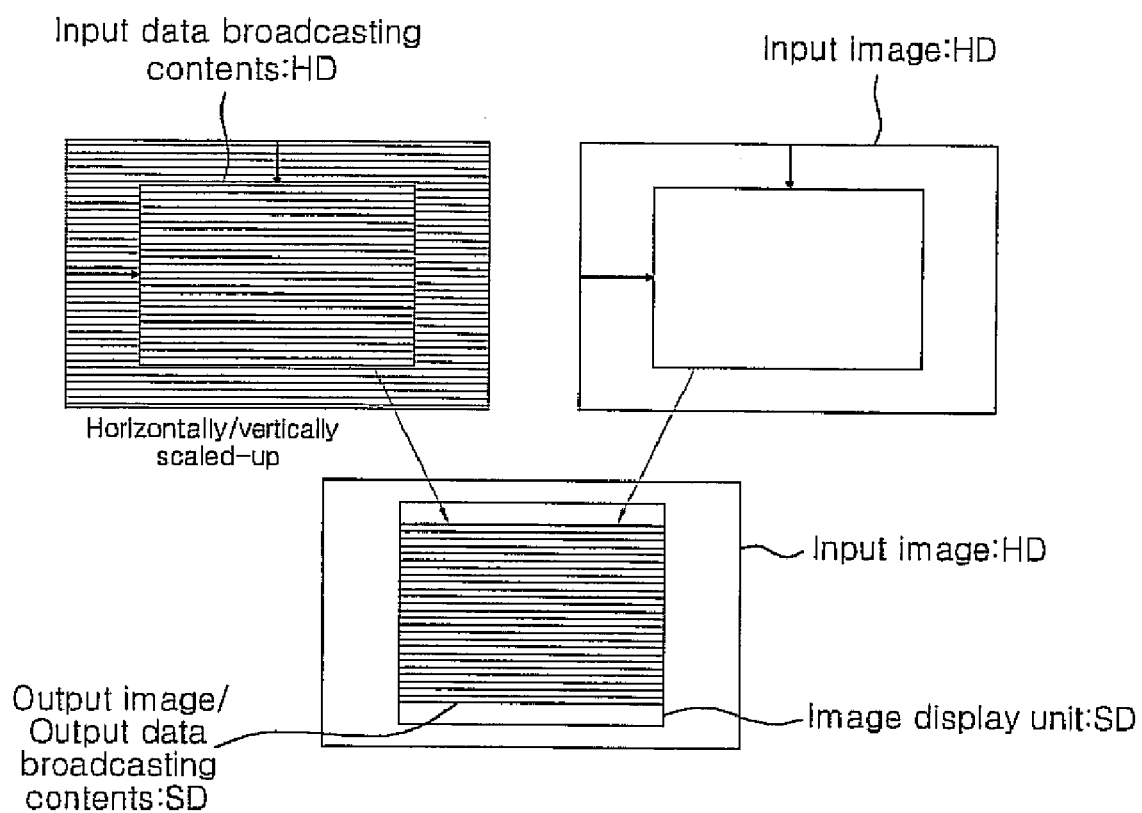

FIGS. 7 through 9 show that an input image format and a data broadcasting contents format are received in HD mode and an output image format is SD mode. In this case, scaling processing for the received input image and data broadcasting contents can be applied differently according to detailed selection of output image format.

First, FIG. 7 shows that an output image format is set to be central viewing mode of SD modes. In this case, both ends of the input image are cut out and the data broadcasting contents are scaled-down in horizontal and vertical directions and the reduction scaled data broadcasting contents are processed to scroll horizontally.

Then, FIG. 8 shows that an output image format is set to be film viewing mode of SD modes. In this case, both ends of the input image are cut out and the data broadcasting contents are scaled-down in horizontal and vertical directions and outputted or the data broadcasting contents are not scaled but scroll function is provided.

Then, FIG. 9 shows that an output image format is set to caption mode of SD modes. In this case, the input image is scaled-down in horizontal and vertical directions to be outputted and the data broadcasting contents are scaled-down and displayed in horizontal and vertical directions.

Figure 10:
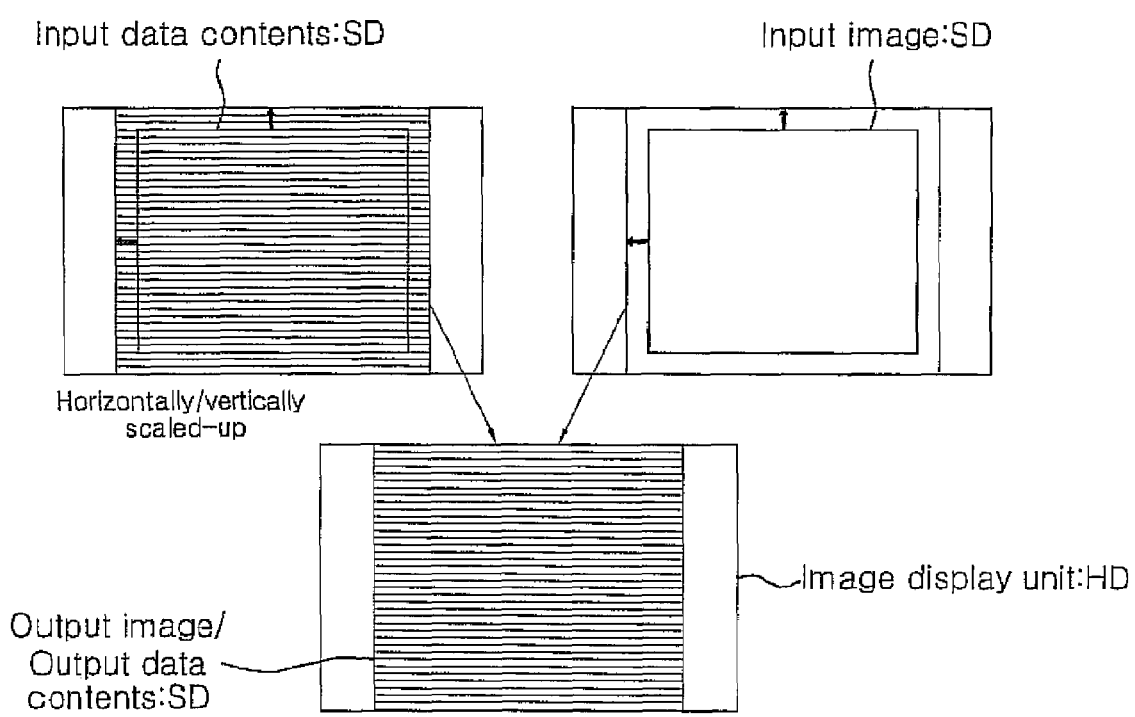
Figure 11:
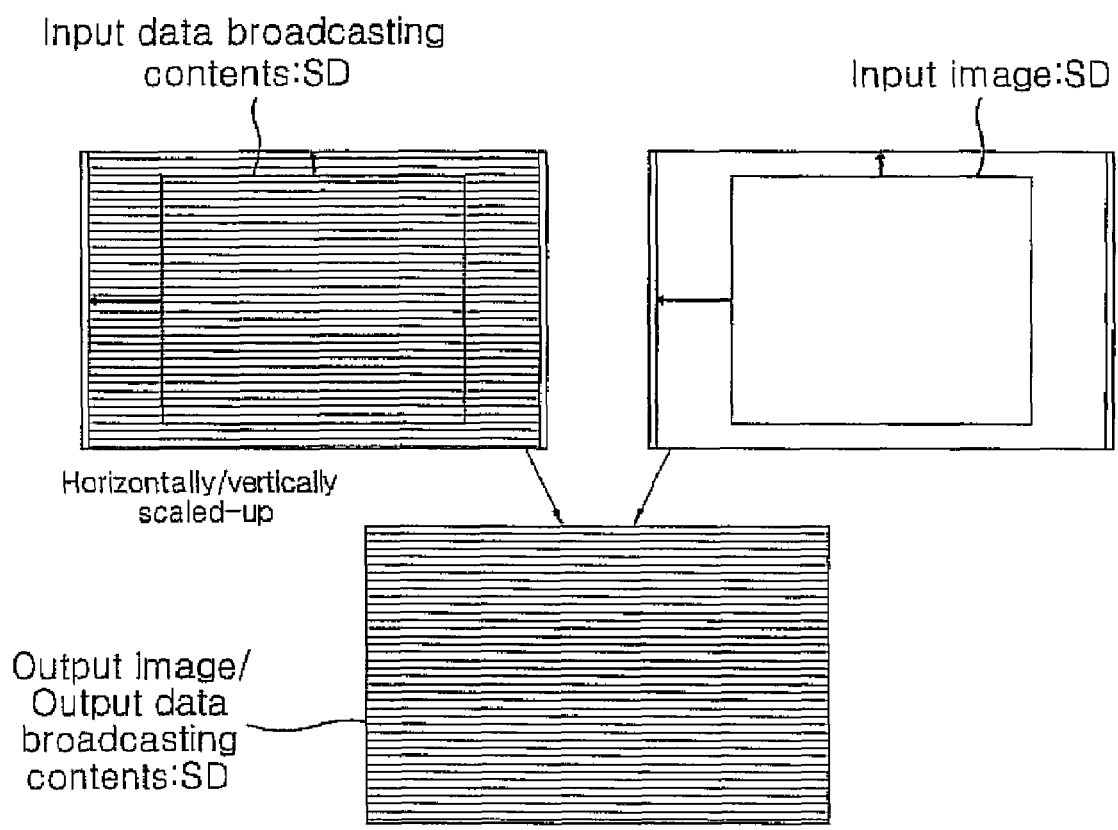

FIGS. 10 and 11 show that the input image format and the data broadcasting contents format are received in SD mode and the output image format is set to an HD mode. In this case, scaling processing for the received input image and data broadcasting contents can be applied differently according to detailed selection of output image format.

FIG. 10 shows that the input image format and the data broadcasting contents format are received in SD mode and the output image format is set to a standard mode of ID mode. In this case, the input image is scaled-up and displayed in horizontal and vertical directions and the data broadcasting contents are scaled-up and displayed in horizontal and vertical directions.

FIG. 11 shows that the input image format and the data broadcasting contents format are received in SD mode and the output image format is set to be wide mode of HD mode. In this case, the input image is scaled-up and displayed in horizontal and vertical directions and the data broadcasting contents are scaled-up and displayed in horizontal and vertical directions.

As described above, according to the present invention, the image display apparatus and operating method of the present invention has the advantages to display the data broadcasting contents without distortion by reducing or expanding the display size of the data broadcasting contents according to the resolution of the input image and the resolution of the output image if the resolution of the input image is different from that of the output image.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An image display apparatus comprising:
    a comparing unit for obtaining a first information on a predetermined output image format, obtaining a second information on a received input image format and a data broadcasting contents format and comparing the first information with the second information on the formats;
    a controlling unit for controlling output modes for the input image format and the data broadcasting contents format according to the predetermined output image format based on a comparison result of the output image format, the input image and the data broadcasting contents format performed by the comparing unit;
    an OSD processing unit for processing an output of the received data broadcasting contents under a control of the controlling unit so that the received data broadcasting contents are scaled or realized without scaling to provide a scroll function in horizontal and vertical directions;
    an image display processing unit for processing an output of the received input image under a control of the controlling unit so that the received input image is scaled or both ends of the received input image are cut out; and
    an image display unit for outputting the data broadcasting contents processed by the OSD processing unit and the input image processed by the image display processing unit.

2. The image display apparatus according to claim 1, wherein the controlling unit controls the output modes of the input image format and the data broadcasting contents format using hardware means when controlling the output format according to the predetermined output image format.

3. The image display apparatus according to claim 1, wherein the controlling unit controls the output modes of the input image format and the data broadcasting contents format using software means when controlling the output format according to the predetermined output image format.

4. A method of managing an image display apparatus, the method comprising:
    (a) obtaining a first information on a predetermined output image format;
    (b) obtaining a second information on an input image format and a data broadcasting contents format;
    (c) comparing the first information on the predetermined output image format with the second information on the input image format and the data broadcasting contents format;
    (d) processing the input image format and the data broadcasting contents format according to the predetermined output image format based on a comparison result of the output image format so that the input image format is scaled or both ends of the received input image are cut out and the data broadcasting contents formats are scaled or realized without scaling to provide a scroll function in horizontal and vertical directions; and
    (e) outputting on image display unit the processed input image and the processed data broadcasting contents output modes.

5. The method according to claim 4, wherein the predetermined output image format in the step (a) is set by a user selecting an output image format selection switch provided in the image display apparatus.

6. The method according to claim 5, wherein the settable output image format is selected from a group consisting of 720.times.480 I (SD), 720.times.480 p (SD), 1920.times.180 I (HD, 960.times.540 for data broadcasting contents) and 1280.times.720 p(HD).

7. The method according to claim 4, wherein in the step (d), if the formats are identical with each other, the input image and the data broadcasting contents are outputted on an image display unit without processing the output format.

8. The method according to claim 7, wherein if the input image format and the data broadcasting contents format are received in an SD mode having a resolution of 720.times.480 and the output image format is set to the SD mode, the received input image and the received data broadcasting contents are outputted on an image display unit in the central viewing mode without scaling process.

9. The method according to claim 7, wherein the input image format and the data broadcasting contents format are received in an HD mode having a resolution of 1920.times.1080 I or 960.times.540 and the output image format is set to the HD mode, the received input image and the received data broadcasting contents are outputted on an image display unit in a wide mode without scaling process.

10. The method according to claim 4, wherein if the input image format and the data broadcasting contents format are received in an HD mode and the output image format is set to be central viewing mode of an SD mode, both ends of the input image are cut out and the data broadcasting contents are scaled-down in horizontal and vertical directions and the reduction scaled data broadcasting contents are processed to be scrolled horizontally.

11. The method according to claim 4, wherein if the input image format and the data broadcasting contents format are received in an HD mode and the output image format is set to a full viewing mode of an SD mode, both ends of the input image are cut out and the data broadcasting contents are scaled-down in horizontal and vertical directions and outputted.

12. The method according to claim 4, wherein if the input image format and the data broadcasting contents format are received in an HD mode and the output image format is set to a caption mode of an SD mode, the input image is scaled-down and displayed in horizontal and vertical directions and the data broadcasting contents are scaled-down and displayed in horizontal and vertical directions.

13. The method according to claim 4, wherein if the input image format and the data broadcasting contents format are received in an SD mode and the output image format is set to a standard mode of an HD mode, the input image is scaled-up and displayed in horizontal and vertical directions and the data broadcasting contents are scaled-up and displayed in horizontal and vertical directions.

14. The method according to claim 4, wherein if the input image format and the data broadcasting contents format are received in an SD mode and the output image format is set to a wide mode of an HD mode, the input image is scaled-up and displayed in horizontal and vertical directions and the data broadcasting contents are scaled-up and displayed in horizontal and vertical directions.

15. The method according to claim 4, wherein in the step (e), the input image and/or the data broadcasting contents are outputted to be scrolled on an image display unit.

\* \* \* \* \*